A. MESSERSCHMITT.
PROCESS OF AND APPARATUS FOR MAKING HYDROGEN.
APPLICATION FILED JUNE 12, 1913.
1,152,197.
Patented Aug. 31, 1915.
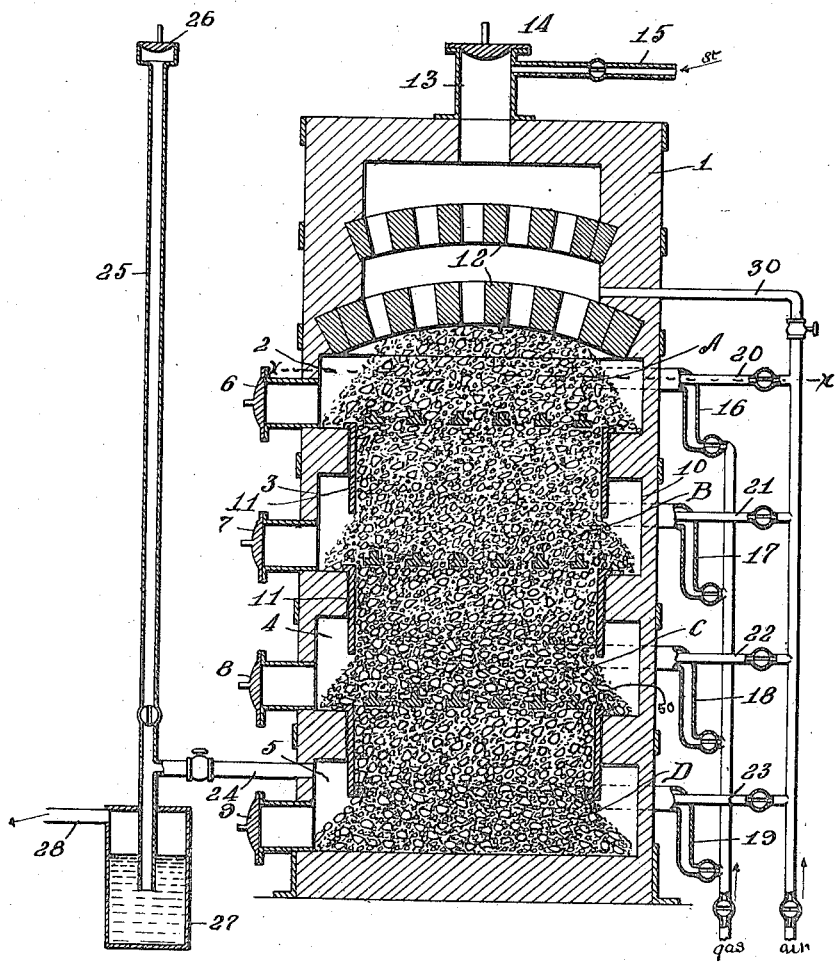
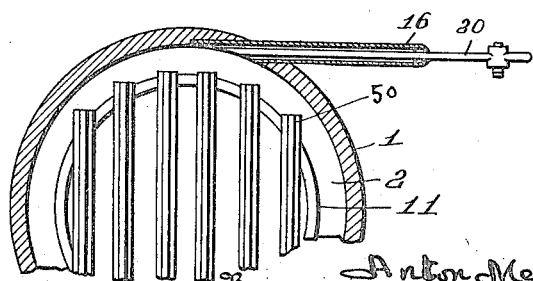

UNITED STATES PATENT OFFICE.

ANTON MESSERSCHMITT, OF STOLBERG, GERMANY.

PROCESS OF AND APPARATUS FOR MAKING HYDROGEN.

1,152,197.  Specification of Letters Patent.  Patented Aug. 31, 1915.

Application filed June 12, 1913. Serial No. 773,205.

*To all whom it may concern:*

Be it known that I, ANTON MESSERSCHMITT, a citizen of the German Empire, residing at Stolberg, in Rhineland, Germany, have invented certain new and useful Improvements in Processes of and Apparatus for Making Hydrogen, of which the following is a specification.

This invention relates to processes of and apparatus for making hydrogen; and it comprises a method of producing hydrogen by alternate reduction and steaming of a ferruginous contact mass arranged as a column, or as successive layers, wherein such contact mass is zonally reduced and heated, successive layers or strata being succcessively reduced and the emerging reducing gases from each such layer or stratum being used to impart combustion heat to the next succeeding stratum prior to the reduction of such next succeeding stratum and wherein zonal heating of successive layers is resorted to; and it further comprises a new organization of elements comprising a shaft or the like, a column of pervious filling of ferruginous material therein, means for introducing steam at one end of said shaft, means for removing hydrogen at the other end and a plurality of means for introducing air and for introducing reducing gases located at a plurality of successive points along the length of said shaft; all as more fully hereinafter set forth and as claimed.

The manufacture of hydrogen by alternate reduction and steaming of a ferruginous contact mass although simple in principle, is one which presents many difficulties on the large scale; these difficulties being mainly those incident to heating. While the reducing and steaming or oxidation reactions themselves do not absorb much heat, the alternate reduction and oxidation of the iron practically balancing thermally, yet, apart from radiation losses, the passage of large volumes of gases and of steam through the apparatus carries away much heat which must be replaced. And it is necessary to keep the reaction mass at a rather exact temperature. Overheating is apt to result in welding of the particles of spongy iron with consequent diminution of porosity and active surface and, in the oxidizing pass, in formation of slag by the oxid of iron uniting with silica and silicates, such as clay. Underheating lessens production of hydrogen and is also apt to cause a deposition of carbon in the reducing pass with possible formation of iron carbids which will give evil-smelling hydrocarbons in the steaming stage. As capacity, or output, is dependent on the active surface exposed and on the quantity of gases and steam which can be contacted with such surface in a time unit, a loose porous filling is necessary and this porosity interferes materially with heating uniformly. Ordinarily, the operation is conducted in a furnace-heated iron or steel retort, usually circular in cross-section. Necessarily, the larger is this retort, the less is the ratio of heat receiving surface to the active contents and the higher the temperature of the retort must be maintained to insure penetration of the necessary heat units to the center of the reaction mass in a reasonable time. This is apt to result in overheating at the circumference of the reaction mass and also in a rapid deterioration of the retort by the oxidizing action of the furnace gases. The retorts for this reason are not of long life; and particularly so since they must be replaced as soon as any substantial cracking or porosity appears, hydrogen diffusing rapidly through even minute orifices. The same objection of the difficulty of communicating heat through any great distance of such a porous and channeled reaction mass obtains in performing the operation in a shaft or tower filled with such reaction material and attempting an internal heating by an inflowing hot draft current. It is difficult in any reasonable time to obtain a uniform temperature throughout the height of a vertical column of such material without overheating the first layer where the draft current enters. The margin between the temperature which is necessary for reaction and that which injures the material is not great. The effort is always to save time by using unduly heated draft currents.

In the accompanying invention I have devised a method and means for carrying the necessary heat into the mass without the objections obtaining both to the use of an externally heated iron retort and of the usual type of shaft furnace. In this invention I maintain a column of porous and channeled reaction material in a suitable shaft or the like; this column and shaft being best vertically disposed; but in lieu of attempting to heat all the various successive layers se-

*riatim* through one layer by hot draft currents applied to the first layer in series, I heat these layers successively and methodically, heating first the lowermost layer, then the next succeeding and so on until the various layers are at the desired temperature. Reduction is performed in the same manner and by so doing I can secure a considerable economy, since I can use the reducing gas which has passed through one layer and reduced the iron oxids therein but which is still freely combustible, for heating the next superimposed layer. For this purpose I cause such gas to burn in the pores, and channels of such next layer by the introduction of air.

In the manufacture of hydrogen, iron oxids are first reduced to spongy metal by a reducing gas and thereafter the iron is steamed to produce hydrogen and oxid of iron. While in this oxidized condition there is no harm in allowing air access to the material and this fact renders feasible the stated method of burning combustible gas in direct contact with the material. However, as a matter of fact, in the combustion there need be no excess of oxygen; there need be no such quantity of oxygen or air in excess as would injuriously affect such contact mass. While gases burning with air in free space ordinarily require a considerable excess of air for rapid combustion, say, 10 to 20 per cent. over that theoretically necessary, this is not so with gas burning in direct contact with a catalytically acting material, as in the present instance where gas and air are burned together in the pores or channels of a contact mass. Sufficient combustion and development of heat may be attained even with a deficit of air; *i. e.* where the emerging gases are still combustible. In the present invention therefore I provide a shaft of some suitable refractory material. As no heating by conduction through its walls is to be performed, the shaft or chamber is advantageously made of masonry and has walls of refractory material of considerable thickness to reduce losses of heat by radiation. It may be advantageously heat-insulated. Within this chamber I place a column, or successive layers, of ferruginous reaction material in any desired manner which will afford free penetration of draft currents throughout the length of the column while at the same time insuring that such draft currents shall be in efficient contact with the active reaction material. Advantageously, the shaft is lined with iron to promote gas tightness. This iron lining while not indispensable, is advantageous. It may be in one or many sections. Its surface, which is alternately oxidized and reduced, takes some part in the various reactions and since it is reduced from time to time it is of comparatively long life. Suitable connections at the ends or the top and bottom of the apparatus allow introduction of steam and removal of hydrogen. Along the height of the column I place at suitable intervals, corresponding to the desired thickness of layer or zone, connections whereby I can introduce both air and reducing gas. Advantageously, at these points I may channel or recess the wall of the chamber to form annular ducts or channels into which the connections for air and gas open. These connections are best so arranged as to discharge tangentially into these channels. If the contact material is contained in the chamber as loose lumps, as it frequently is, by suitable arrangements the base of each sub-pile may extend into and on the base of this channel as an angle-of-repose pile, leaving the upper portion of the channel free and unobstructed for circumferential circulation of gas or air or of flame. Or the reaction mass may be contained in orificed steel or iron containers of suitable shape. With such a structure, presuming that a steaming and hydrogen producing stage is just ended and that the active surface of the contact mass is in the condition of oxid, I may pass air and gas into the lowermost annular channel in the series in such a way as to develop the necessary amount of heat in the proximate lateral layer of contact mass. The products of combustion rise through the porous mass into the next succeeding upper layers and thence to a point of escape. This lowermost layer having received the desired number of heat units, the supply of air is cut off, while that of gas is continued. This gas now enters the hot contact mass and reduces it to metallic iron. This action being of the type of those known as "mass actions," the reducing gas is not wholly oxidized in this reduction but is still freely combustible. Rising into the next vertical layer, it is there burned by introduction of air into the next succeeding annular channel. This air passes from the annular channel into the porous contact mass and meets the gas from the layer next below, burning it in place and affording heat to the layer in which combustion takes place. When the second layer is properly heated, the introduction of air at this point stops, while gas is now introduced. Passing into the proximate layer of contact material the gas reduces it and emerges, still freely combustible, into the next succeeding upper layer where it is burned by air introduced at this point. This methodical operation is continued throughout the height of the shaft.

In another method of operation, the lowermost layer may first be heated by circling flame, then the next and so on upward until all the material in the shaft is at the proper temperature. This being the case, gas is introduced in the lowermost layer; then in the next layer and so on upward. In other words, heating and reduction are two separate operations.

In the accompanying illustration I have shown, more or less diagrammatically, an organization of apparatus elements within the present invention. In this showing Figure 1 is a central vertical section of one type of apparatus which may be used; and Fig. 2 is a fragmental horizontal section of the same (along line x—x of Fig. 1) at the point where pipes 16 and 20 enter.

In this showing, element 1 is a vertical shaft of masonry or the like. At various points along its height the inner wall is channeled to afford annular recesses 2, 3, 4 and 5. Four of these recesses are shown, corresponding with layers A, B, C and D of the reaction material. Doors 6, 7, 8 and 9 communicate with these recesses. The inner wall may or may not be lined with iron or steel lining 10. This lining may be in one or several sections. Within this shaft is a column of reaction material which may be lump iron ore, artificial oxids of iron, hammer scale or any other material of like character. The column may be made of a mixture of scrap iron with iron ore, the scrap iron serving to maintain the porosity of the mass. Lump manganiferous iron ore is a very suitable reaction material to use as in the reduction phase the manganous oxid produced serves to space apart the particles of metallic iron and prevent their fusing and welding together in a heating phase with destruction of porosity. The manganese also exercises a specific catalytic action which is desirable and further operates to prevent the deposition of carbon or the formation of iron carbids should the reaction mass temporarily run too cool. Artificial mixtures of manganese and iron oxids may be used. In the arrangement of the column, the maintenance of the porosity and perviousness of the column of material may be aided by the location at intervals of iron or steel elements 11 across the column to box off the layers, each such box being provided with an internal filling of the same reaction mass and having a perforated top and bottom. As shown, these boxes rest on ears or lugs entering the stated annular recesses. On each box is a pile of loose material which may enter the recess as an angle-of-repose pile. Above the top of the uppermost pile may be sprung one or more perforated arches 12 of refractory brick to act as heat regenerators for a purpose later described. At its top, the apparatus is provided with conduit 13 closed by damper valve 14 and provided with steam inlet conduit 15. Entering the circumferential recesses are gas inlets 16, 17, 18 and 19 and air inlets 20, 21, 22 and 23. Leading from the lowermost annular recess (5) is gas outlet 24 leading to pipe 25. At the top this pipe is provided with damper or valve 26 while at its base it dips into seal pot 27 provided with outlet 28.

As shown, in Fig. 2 gas and air are best introduced tangentially into the recesses. This tends to carry the flame, the gas or the air circumferentially around the layer of material giving a better distribution of the heat or of the draft currents as the case may be and prevents direct impingement on the ore pile. In the case of flame, direct impingement of a jet flame is apt to cause local overheating. As stated the porous material is not a very good conductor of heat. It is advantageous to construct the inner iron lining of the shaft, if used, with a vertical line of division. This enables disassemblage of the structure to an extent sufficient to take out the filling mass. For example, half the brick work in the upper recesss may be taken out, the loose reaction mass having been first removed through door 6. The iron box may then be lifted out and replenished. On removing the loose pile of material below the top box, the next box may be lifted out in similar manner. To facilitate removal in this manner, it is better to make the boxes in downward succession of slightly decreasing width.

In the use of the described structure presuming a steaming and hydrogen-producing stage just ended and replenishment of heat to be necessary, top cap 14 is removed. Air and gas are introduced through 23 and 19. Ignition takes place with production of a circling heating flame sweeping around 5. The products of combustion pass inward and upward through the reaction mass, heating the layer D of material laterally next recess 5 and the material thereabove. As soon as the layer D of material is heated sufficiently, introduction of air by 23 is stopped, the flow of gas through 19 being continued and introduction of air through 22 begun. The gas from 19 now reduces the reaction material of layer D and passes upwardly into layer C where it is joined by the air from 22. The resultant combustion now heats layer C. Introduction of gas at 19 and air at 22 now cease while gas is fed in at 18 and air is supplied at 21. Reduction of C and heating of B now take place. B is next reduced and A heated in a similar way. When A is hot introduction of air at 20 ceases and air is fed in at 30. The reducing gas passes upward from A and is burnt in the diagrammatically shown checker 12 by the air from 30. After the reduction of A, the hydrogen producing pass is begun. Damper 14 is closed and steam from 15 allowed to flow downward through the column, displacing gases before it and forming hydrogen. The waste gases are vented at 26 and when sufficiently pure hydrogen appears, it is sent to a place of use through 28. At the end of the steaming stage, the described heating and reducing steps may be again performed. In another method of operating, combustion may be successively effected in channels 5, 4, 3 and 2, thereby heating the reaction mass uniformly from bottom to top; and then reduction effected by admitting reducing gas at 19 and allowing it to rise through the column, ultimately burning it by air from 30.

In an alternative method of operation, gas may be admitted at 19 with a modicum of air from 23. The amount of air may be from 10 to 20 per cent. of the volume of gas. With a limited amount of the gas does not lose its power of reducing oxids of iron but under the catalytic effect of the reaction mass combustion to the extent permitted by the amount of air takes place in the reaction mass with concomitant development of heat in the place where it is needed. The gas from D may be burnt in C as before and then gas with a limited amount of air admitted from 18 and 22; and so on up the column. Or after finishing the reduction of D, without admitting air alone to C, a current of gas from 18 with a modicum of air from 22 may be allowed to enter C; and so on. Many other permutations and modifications are possible.

While other gases, such as oil gas, natural gas, Mond gas, etc., may be used in the heating and reduction stages, I find "blue" water gas the most satisfactory.

The iron cross-elements 11 may be replaced by simple perforated cross plates or by bars, or may be omitted altogether. Their use is however advantageous.

What I claim is:—

1. In the manufacture of hydrogen, the process which comprises successively steaming, heating and reducing a pervious column of ferruginous reaction material, such heating being by application of combustion heat in a plurality of successive stages to a succession of layers of material along the length of such column.

2. In the manufacture of hydrogen, the process which comprises successively steaming, heating and reducing a pervious column of ferruginous reaction material, such heating being by application of combustion heat in a plurality of successive stages to a succession of layers of material along the length of such column with development of combustion heat within said material.

3. In the manufacture of hydrogen, the process which comprises successively steaming, heating and reducing a pervious column of ferruginous reaction material, such heating being by applying a flame of gas and air circumferentially in contact with a relatively short layer in such column.

4. In the manufacture of hydrogen by the alternate steaming and reduction of a pervious column of ferruginous reaction material, the process of reducing and heating such column which comprises producing an ignited flow of gas and air circumferential of a layer of the material in such column until such layer is heated to the desired degree, products of combustion being removed through such layer, and then cutting off the flow of air while continuing that of gas until the heated layer is reduced to the desired degree.

5. In the manufacture of hydrogen by the alternate steaming and reduction of a pervious column of ferruginous reaction material, the process of reducing and heating such column which comprises producing an ignited flow of gas and air circumferential of a layer of the material in such column until such layer is heated to the desired degree, products of combustion being removed through such layer, cutting off the flow of air while continuing the flow of gas until the heated layer is reduced and during such flow of gas into this layer admitting air to the next proximate layer to burn the effluent gas from the layer undergoing reduction in said next proximate layer.

6. In the manufacture of hydrogen by the alternate steaming and reduction of a pervious column of ferruginous reaction material, the process of heating and reducing a column of such material which comprises passing currents of reducing gas successively into and through successive layers and burning the effluent gas from each preceding layer by admission of air into the next succeeding layer, said operations being continued until the material of said column is heated and reduced from end to end.

7. In the manufacture of hydrogen by the alternate steaming and reduction of a pervious column of ferruginous material contained in a vertical shaft, the process of heating and reducing such column in a plurality of stages which comprises heating an under layer, reducing the heated layer by introduction of reducing gas, burning the effluent gas from such layer in the next succeeding upper layer by introduction of air until heating thereof is effected and then introducing gas into such next succeeding upper layer to reduce the same, this operation being repeated until all layers have been heated and reduced.

8. In the manufacture of hydrogen by the alternate steaming and reduction of a pervious column of ferruginous reaction material, the process of reducing and heating such column which comprises producing an ignited flow of gas with a little air, the amount of such air being insufficient for complete combustion, circumferential of a layer of the material in such column until such layer is heated to the desired degree, products of combustion being removed through such layer, and then cutting off the flow of air while continuing that of gas until the heated layer is reduced to the desired degree.

9. In a hydrogen generating apparatus, a casing, a column of pervious ferruginous reaction material therein, connections for introducing steam at one end, connections for removing hydrogen at the other, a plurality of means for introducing air at different points along said column and means for introducing reducing gas at each such point.

10. In a hydrogen generating apparatus, a vertical shaft, a column of pervious ferruginous reaction material therein, connections for introducing steam at one end, connections for removing hydrogen at the other, a plurality of means for introducing air at different points along its height and means for introducing reducing gas at each such point.

11. In a hydrogen generating apparatus, a casing having a plurality of internal circumferential recesses in its wall, a column of pervious ferruginous reaction material arranged in the casing in such manner as to leave a free space therearound in each such recess, connections for introducing steam at one end, connections for removing hydrogen at the other, means for introducing air into each of said recesses and means for introducing reducing gas into each such recess.

12. In a hydrogen producing apparatus, a vertical shaft having a plurality of internal circumferential recesses at various points along its height, a pervious column of ferruginous material within said shaft, connections for introducing steam and for removing gases at its ends and means for introducing gas and for introducing air into each such recess.

13. In a hydrogen producing apparatus, a vertical shaft, a columnar filling of pervious ferruginous reaction material in said shaft, means for introducing steam at the top, means for removing waste gases at the top, means for removing hydrogen at the base, a plurality of means for introducing reducing gas located at various points along its height and means for introducing air at each such point.

14. In a hydrogen producing apparatus, a vertical shaft, means for supporting a column of pervious ferruginous reaction material therein, a waste gas outlet near the top, a heat storing checker between said column and said outlet, means for passing steam through said checker, means for removing hydrogen near the base of the column, means for introducing reducing gas at a plurality of points along the height of said column and means for introducing air at such points.

15. In a hydrogen producing apparatus, a vertical shaft of refractory material having a plurality of circumferential recesses in its inner wall, means for supporting a column of pervious ferruginous reaction material in such shaft in such manner as to leave a clear circumferential space in each such recess, a waste gas outlet near the top, a heat storing checker between said column and said outlet, means for passing steam through said checker, means for removing hydrogen at the base of the column, means for introducing air into each such recess and means for introducing gas into each such recess.

In testimony whereof, I affix my signature in the presence of two subscribing witnesses.

ANTON MESSERSCHMITT.

Witnesses:
MARTHA MESSERSCHMITT,
CARL ANDREAS.